(12) United States Patent
Maisenhälder

(10) Patent No.: US 8,739,833 B2
(45) Date of Patent: Jun. 3, 2014

(54) VENTING VALVE

(75) Inventor: Heiko Maisenhälder, Bad Wimpfen (DE)

(73) Assignee: KACO GmbH + Co. KG, Heilbronn (DE)

( * ) Notice: Subject to any disclaimer, the term of this patent is extended or adjusted under 35 U.S.C. 154(b) by 126 days.

(21) Appl. No.: 13/041,717

(22) Filed: Mar. 7, 2011

(65) Prior Publication Data

US 2011/0220830 A1 Sep. 15, 2011

(30) Foreign Application Priority Data

Mar. 12, 2010 (DE) .................. 10 2010 012 018

(51) Int. Cl.
*F16K 15/14* (2006.01)
(52) U.S. Cl.
USPC ...................... 137/845; 137/850; 251/366
(58) Field of Classification Search
USPC .......... 137/515, 843, 845, 846, 850, 851, 859; 251/366
See application file for complete search history.

(56) References Cited

U.S. PATENT DOCUMENTS

| | | | | |
|---|---|---|---|---|
| 996,588 A * | 6/1911 | Kennedy | ................... | 137/515.7 |
| 1,865,764 A * | 7/1932 | Keenan | ........................ | 215/260 |
| 2,162,455 A * | 6/1939 | Hoge | ........................... | 215/310 |
| 2,646,063 A * | 7/1953 | Hayes | ......................... | 137/218 |
| 4,794,942 A | 1/1989 | Yasuda et al. | | |
| 4,991,745 A * | 2/1991 | Brown | ........................ | 222/212 |
| 5,188,140 A | 2/1993 | Kosaka | | |
| 5,250,266 A | 10/1993 | Kanner | | |
| 5,312,188 A * | 5/1994 | Ashe | ............................ | 374/155 |
| 6,092,551 A * | 7/2000 | Bennett | ....................... | 137/846 |
| 7,530,369 B2 * | 5/2009 | Anderson | .................... | 137/846 |
| 2002/0189694 A1* | 12/2002 | Katayama et al. | ............ | 137/846 |
| 2003/0111122 A1* | 6/2003 | Horton | ......................... | 137/846 |
| 2004/0003846 A1* | 1/2004 | Seidl | ............................ | 137/493 |
| 2009/0177187 A1* | 7/2009 | Weaver Quigley et al. | .. | 604/537 |
| 2009/0259175 A1* | 10/2009 | Nordgren | ........................ | 604/30 |
| 2010/0019178 A1* | 1/2010 | Wilson et al. | ................ | 251/61.1 |

FOREIGN PATENT DOCUMENTS

| | | |
|---|---|---|
| WO | 92/09942 | 6/1992 |
| WO | 99/56816 | 11/1999 |
| WO | 00/29297 | 5/2000 |

* cited by examiner

*Primary Examiner* — Craig Schneider
*Assistant Examiner* — Jessica Cahill
(74) *Attorney, Agent, or Firm* — Gudrun E. Huckett

(57) ABSTRACT

A venting valve has a securing part and a valve body connected to the securing part and provided with at least one venting slot. A closure tension acts on the venting slot and is caused by a force generated within the venting valve after mounting. The venting valve is made of a unitary elastomer material.

13 Claims, 4 Drawing Sheets

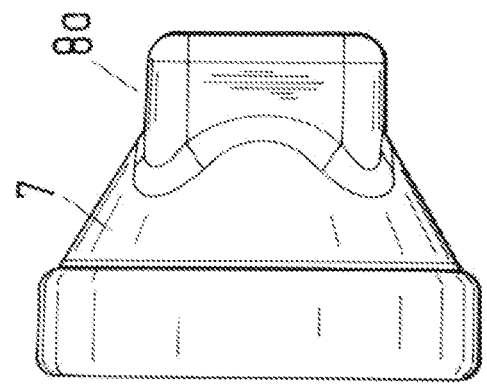
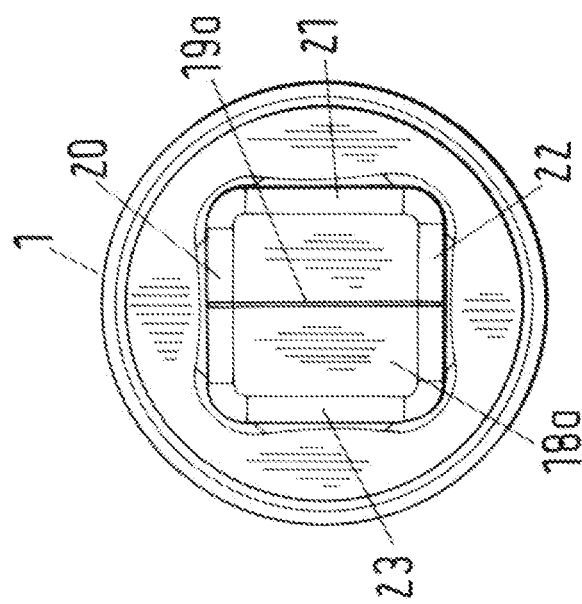

VENTING VALVE

BACKGROUND OF THE INVENTION

The invention concerns a venting valve with a securing part and a valve body that is provided with at least one venting slot.

Such venting valves are used for different apparatus, for example, motor, axle or transmission housings. The venting valves are in the form of elastomer caps with an integrally formed venting slot. These elastomer caps are mounted on support components that are, for example, steel or plastic pipes, steel or plastic housings and the like. Therefore, several components must be manufactured and assembled so that the assembly expenditure is high. Moreover, at least two different components are required, i.e., the support component as well as the elastomer cap. The support component must be sealed relative to the apparatus so that further components as well as further assembly steps are required. In practice, it has been found that the elastomer caps generally will not seal properly so that they do not fulfill to a satisfactory degree the sealing function. By using several components also a large mounting space is required.

SUMMARY OF THE INVENTION

The invention has the object to configure the venting valve of the aforementioned kind such that it can be manufactured and assembled in a simple and inexpensive way while it ensures a reliable sealing action and requires little mounting space.

This object is solved for the venting valve of the aforementioned kind in accordance with the invention in that a closure tension acts on the venting slot that is caused by a force generated within the venting valve once the venting valve is mounted.

In the venting valve according to the invention a closure tension is acting onto the venting slot that ensures that the venting valve in the area of use is properly closed. This closure tension is caused by a force that is generated within the venting valve after mounting. Thus, when the venting valve according to the invention is mounted on the respective apparatus, this force is mandatorily generated and, in turn, exerts the closure tension on the venting slot.

The generating force can be advantageously a radial force.

It is formed in a preferred embodiment by a radial elastic deformation of the securing part of the venting valve. With the securing part the venting valve according to the invention is mounted on the apparatus. The securing part is designed in this connection such that, when the venting valve is mounted, it will be radially expanded.

The securing part is advantageously cylindrical but can also have, depending on the location of use, a different cross-sectional shape.

The securing part is provided on its inner side preferably with a snap-on profile. With it, the securing part and thus the venting valve can be mounted in a simple way on the apparatus. The snap-on profile enables to simply snap on the securing part on an appropriately designed apparatus connector. In this way, a safe attachment of the venting valve on the apparatus connector is achieved.

The generating force can also be an axial force that generates the closure tension at the venting slot.

In this case, the venting slot advantageously has an insertion part that is inserted into a bore of the apparatus. The insertion part is elastically deformed in the bore such that the axial force that serves for generating the closure action is generated.

The insertion part has advantageously a thick end section that ensures a safe seat of the venting valve in the bore.

The securing part can be connected to an end member provided with the valve body. In this way, the holding and the sealing function are distributed onto different areas of the venting valve so that these two parts can be matched optimally to their functional task.

Advantageously, the securing part is connected by a conical member to the end member.

The venting slot can be provided already during manufacture of the venting valve. However, it is also possible to provide it subsequently. A simple manufacture results when in this connection the venting slot extends straight.

An inexpensive manufacture results when the venting valve is comprised of a unitary elastomer material.

BRIEF DESCRIPTION OF THE DRAWINGS

Further features of the invention result from the further claims, the description and the drawings. The invention will be explained in more detail with the aid of two embodiments illustrated in the drawings.

FIG. 3 is a plan view onto a second embodiment of the venting valve.

FIG. 4 is a side view of the venting valve according to FIG. 3.

DESCRIPTION OF PREFERRED EMBODIMENTS

The venting valves disclosed in the following are comprised of elastomer material and are embodied in a cap shape. With the venting valves different apparatus, for example, motor, axle, or transmission housings, are sealed. In the embodiment, the venting valves are designed such that a sealing function below 0.1 bar overpressure within the apparatus is realized by them, above 0.1 bar however they will open. These pressure values are to be understood as exemplary only. The differential pressure can be also higher or lower, depending on the slot configuration, for example.

Figure 1:
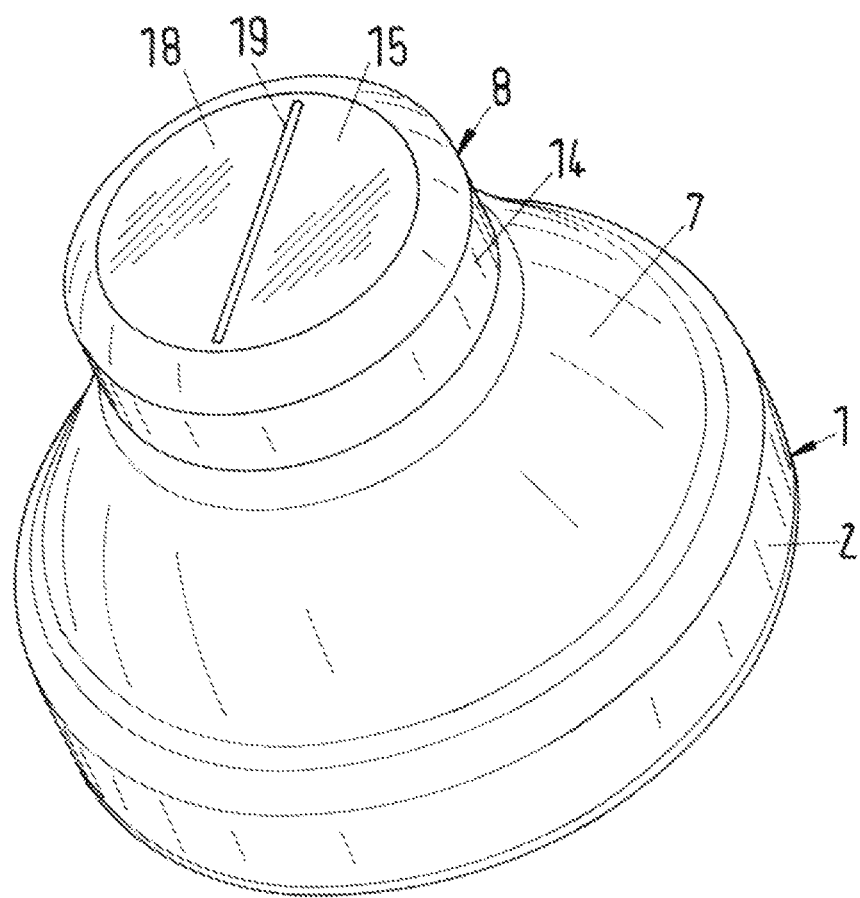
FIG. 1 shows in perspective illustration a first embodiment variant of a venting valve according to the invention.
Figure 2:
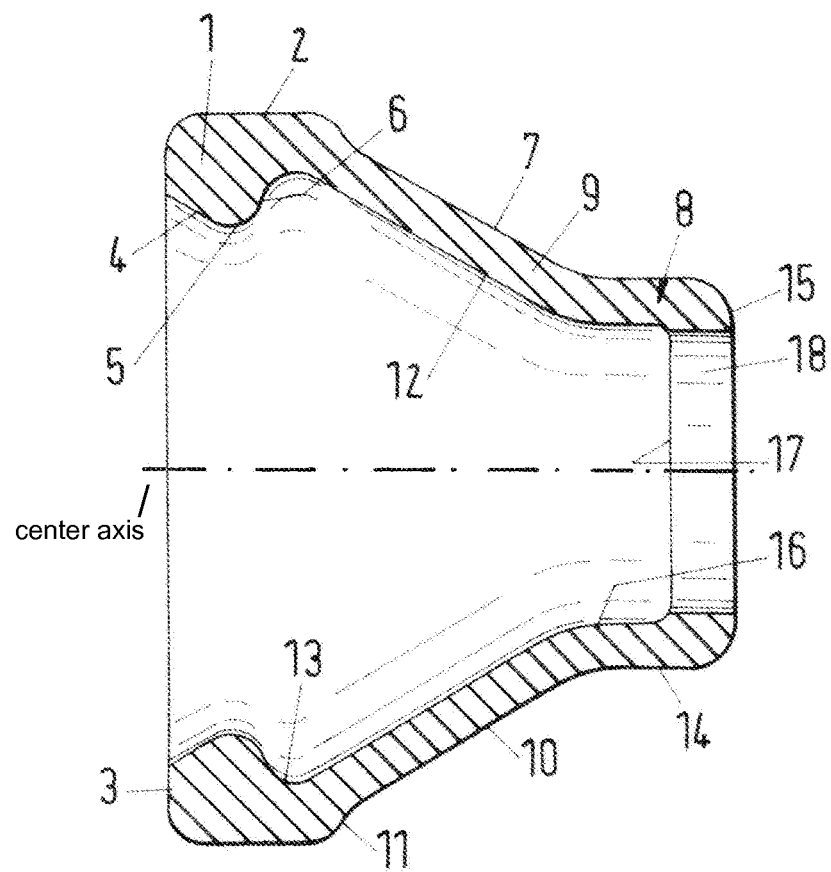
FIG. 2 is an axial section of the venting valve according to FIG. 1.

The venting valve according to FIGS. 1 and 2 has a circular cross-section and is provided with a cylindrical securing part 1 with which the venting valve is attached to an appropriate connector of the apparatus. The securing part 1 has a cylindrical outer wall 2 that passes into a flat end face 3. It passes at an obtuse angle into a conical surface 4 that tapers inwardly. The conical surface 4 passes at a spacing from the end face 3 into a conical surface 6 by an intermediate surface 5 that in axial section is of a part-circular shape. Its diameter increases inwardly. The intermediate surface 5 is positioned approximately at half the axial length of the outer wall 2.

As a result of the described configuration of the inner side of the securing part 1, the venting valve can be snapped onto an appropriately designed connector of the apparatus. The respective rim of the apparatus connector engages behind the intermediate surface 5 so that the venting valve is seated safely on the apparatus connector.

The securing part 1 passes into a conical member 7 that tapers, beginning at the securing part 1, and adjoins a cylindrical end member 8. The conical member 7 has a conical wall 9 that advantageously has a constant thickness. The outer side 10 of the conical wall 9 extends to a point close to the outer wall 2 of the securing element 1. The conical outer side 10 adjoins by means of a short conical surface 11 the cylindrical outer wall of the securing part 1. The conical surface 11 has a greater conical angle than the conical outer side 10 of the conical member 7.

The conical inner side 12 of the conical wall 9 extends in axial direction farther in the direction toward the securing part 1 than the outer side 10. The inner side 12 passes by an arc-shaped transition into the conical surface 6 of the inner side of the securing part 1. This transition 13 has relative to the end face 3 of the securing part 1 a smaller spacing than the transition, formed by the conical surface 11, from the outer side 10 of the conical member 7 into the cylindrical outer wall 2 of the securing part 1.

The wall thickness of the conical wall 9 is smaller than the wall thickness of the securing part 1. It has across its axial length a wall thickness that varies. At the level of the arc-shaped intermediate surface 5 the securing part 1 has its greatest wall thickness. In the area of the transition 13 the securing part 1 has its smallest wall thickness and this thickness is smaller than the wall thickness of the securing part 1 in the area of the end face 3. By this configuration it is achieved that the venting valve with its securing part 1 can be placed without problem onto the apparatus connector. The minimal wall thickness of the conical wall 9 provides an elasticity that is advantageous for the closing function of the venting valve.

The cylindrical end member 8 has a cylindrical outer wall 14 that has a smaller diameter than the cylindrical outer wall 2 and the intermediate surface 5 of the securing part 1. The outer wall 14 advantageously passes with a continuous curvature into the conical outer side 10 of the conical wall 9. The outer wall 14 passes moreover with a continuous curvature into a flat end face 15 of the end member 8.

The cylindrical inner side 16 of the end member 8 passes at one end with continuous curvature into the inner side 12 of the conical wall 9 and at the other end with continuous curvature into the flat inner side 17 of a valve body 18. The inner side 17 is positioned advantageously parallel to the end face 15 of the valve body 18. The valve body 18 has a circular contour (FIG. 1) and in this embodiment is provided with a diametrically extending venting slot 19. This venting slot 19 can be provided already during manufacture of the venting valve. However, it is also possible to provide the venting slot 19 subsequently in the disk-shaped valve body 18. The venting valve embodied purely as an elastomer part can be produced in any suitable way.

The cross-sectional configuration of the venting valve disclosed in connection with FIG. 2 is not be understood as being limiting. Depending on the individual situation and/or material the wall thickness of the venting valve can vary in all areas.

The elastomer venting valve is snapped with the securing part 1 onto the apparatus connector that is, for example, a pipe provided on the apparatus. The securing part 1 is designed such that it is secured by means of radial pretension on the apparatus connector. Since the securing part 1 in comparison to the conical member 7 has a greater wall thickness, the venting valve can be mounted with the radial pretension on the apparatus connector without problems. With this radial pretension a closure tension is acting in the area of the venting slot 19 so that the venting slot 19 is reliably closed. The venting valve is designed such that below a predetermined differential pressure, in the embodiment approximately 0.1 bar, this closure force is higher than the force acting on the inner side 17 of the valve body 18. The apparatus is thus reliably sealed. When the pressure acting on the valve body 18 surpasses the closure tension acting on the venting slot 19 the venting slot 19 opens. In this way, a proper sealing action of the apparatus is ensured.

The venting valve according to FIGS. 3 and 4 is basically of the same configuration as the afore described embodiment. The difference resides only in that the end member 8a has a quadrangular contour, in the embodiment a square contour. The securing part 1 and the conical member 7 are of the same configuration as in the embodiment of FIGS. 1 and 2. The end member 8a can also be cylindrical.

The end member 8a has sidewalls 20 to 23 that are positioned at a right angle to each other and that pass arc-shaped into each other. The end member 8a has the disk-shaped valve body 18a that advantageously has constant thickness and is formed monolithically with the sidewalls 20 to 23.

The valve body 18a is provided with the venting slot 19a which extends between the oppositely positioned sidewalls 20 and 22. The venting slot 19a extends straight and at half the width of the end member 8a.

The venting valve according to FIGS. 3 and 4 is formed advantageously monolithically as an elastomer part. In this way, the venting valve can be manufactured in a simple and inexpensive way.

This venting valve is suitable advantageously to be mounted on a pipe. The securing part 1 of the venting valve enables a secure and seal-tight hold on the pipe. As in the preceding embodiment the securing part 1 is resting with radial pretension on the pipe so that a proper static sealing action of the pipe is achieved. The radial pretension has the result that a closure tension is produced on the venting slot 19a. By means of it, the venting slot 19a is safely closed. When the inner pressure of the apparatus surpasses a predetermined pressure value, in the embodiment 0.1 bar, then the pressure acting on the inner side of the valve body 18a is greater than the closure tension so that the venting slot 19a is opened. When the inner pressure drops below this predetermined value, the closure tension ensures that the venting slot 19a is closed.

Figure 5:
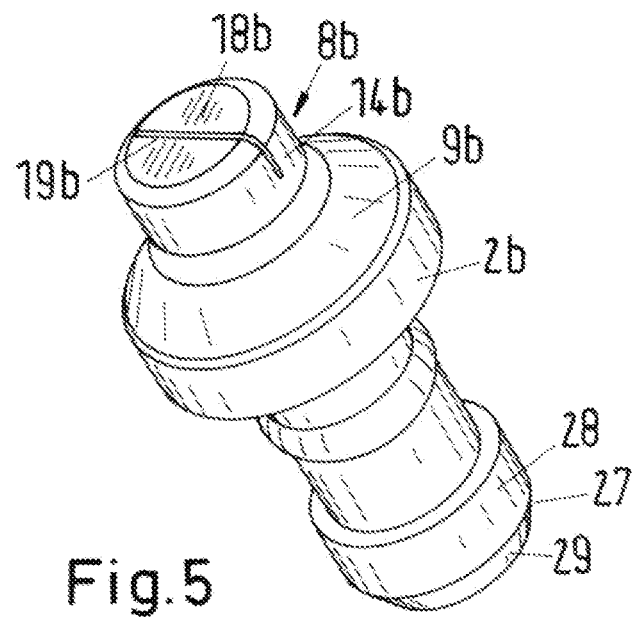
FIG. 5 shows in a perspective illustration a third embodiment of a venting valve according to the invention.
Figure 6:
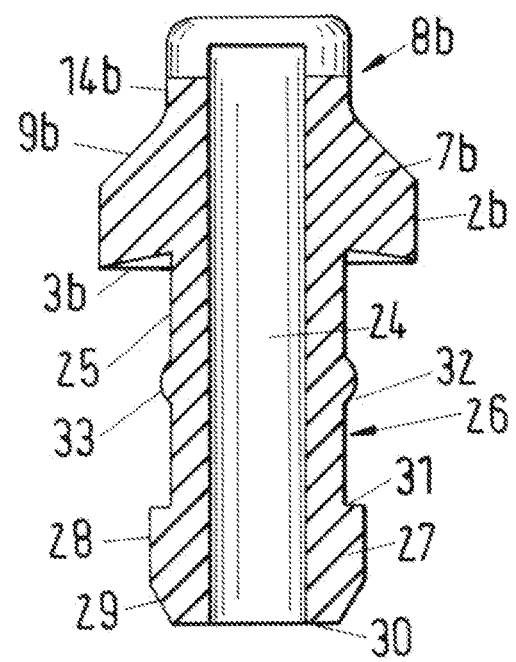
FIG. 6 shows an axial section of the venting valve according to FIG. 5.

The venting valve according to FIGS. 5 and 6 is embodied as a complete valve that in contrast to the preceding embodiments is not placed onto a connector but is inserted into a bore of an apparatus. The venting valve has the end member 8b that is cylindrical but can also have an angled contour. The valve body 18b has the venting slot 19b which is embodied as a diametric slot and extends up to the outer wall 14b of the end member 8b.

The venting valve has an axial through opening 24 that across its length has a constant cross-section. The outer wall 14b passes into the conical member 7b that, in contrast to the preceding embodiment, is solid. It comprises the conical wall 9b that passes into the cylindrical outer wall 2b. The end face 3b that faces away from the valve body 18b extends slightly conically and adjoins a cylindrical wall surface 25 that forms the outer side of an insertion part 26 of the venting valve that adjoins the conical member 7b. The insertion part 26 has outwardly a thick end section 27. i.e., an end section that is thicker than the remaining section of the insertion part 26. It is provided with a cylindrical wall surface 28 that, in the direction of the free end of the insertion part 26, passes into a conical surface 29. The conical surface 29 that tapers in the direction of the flat end face 30 of the insertion part 26 facilitates insertion of the venting valve into the bore of the apparatus.

The end section 27 passes by a section 31 into an intermediate section 32 that extends up to the conical part 7b. The intermediate section 32 has a circular cross-section as does the end section 27. The intermediate section 32 has across its length substantially a constant wall thickness. Only at half the length it is provided at its outer side with a circumferentially extending thick portion 33 that in axial section is embodied to be of a part-circular shape. The maximum diameter of the thick portion 33 is smaller than the diameter of the wall surface 28 whose diameter is smaller than the diameter of the outer wall 2*b*.

The venting valve is comprised unitarily of elastomer material. The insertion part 26 is inserted into the bore of the apparatus with elastic deformation to such an extent that the conical member 7*b* rests with its end face or bottom side 3*b* on the outer side of the apparatus and the end section 27 with the step 31 will engage behind the inner rim of the bore that is positioned within the apparatus. In this way, the venting valve in the area between the end face/bottom side 3*b* and the step 31 is axially elastically expanded. The circumferentially extending thick portion 33 can act like a seal that is resting against the wall of the bore. In the mounted state in the area of the venting slot 19*b* an axial force is thus generated that has the result that the venting slot 19*b* is closed. This closure force is, for example, selected such that the venting slot 19*b* remains closed as long as the differential pressure acting onto the valve body 18*b* from the interior is smaller than, for example, approximately 0.1 bar. When the inner pressure surpasses this value, the venting slot 19*b* opens.

The venting slot 19, 19*a*, 19*b* in the described venting valves can also have a different extension, for example, can be T-shaped. The elastomer material of the venting valve is selected with regard to its application. The elastomer material, for example, can be selected in accordance with the temperatures in use, with respect to acid resistance, with respect to the pressure or similar considerations. The mentioned exemplary pressure limit values of 0.1 bar are only to be understood as an example. The inner pressure of the apparatus to be sealed may also have lower or higher pressure values. The venting valve is embodied accordingly. For example, by selecting the wall thickness and/or height of the conical member 7, 7*b* and/or the wall thickness of the valve body 18, 18*a*, 18*b* and/or of the selected elastomer material, an appropriate adaptation to the respective pressure can be achieved.

Depending on the individual situation and/or temperature and/or media, NBR (nitrile butadiene rubber), HNBR (hydrogenated nitrile butadiene rubber), AEM (ethylene acrylate), ACM (acrylic rubber), FPM (fluorinated rubber) and the like can be considered as elastomer material for the disclosed venting valves, for example.

Basically it is also possible that the venting valve is not comprised of a unitary elastomer material but, for example, is comprised of two elastomer materials. For example, it is possible to select for the valve body 18, 18*a*, 18*b* a different elastomer material than, for example, for the securing part 1 and/or the conical member 7, 7*b*. Advantageously, the disclosed venting valves are used where different temperatures and minimal pressure loading will occur in the apparatus.

When the conical member 7, as in the embodiment of FIGS. 3 and 4, has a rectangular or square contour, the closing force acting on the venting slot is slightly higher than in case of a cylindrical configuration of the conical member.

The specification incorporates by reference the entire disclosure of German priority document 10 2010 012 018.9 having a filing date of Mar. 12, 2010.

While specific embodiments of the invention have been shown and described in detail to illustrate the inventive principles, it will be understood that the invention may be embodied otherwise without departing from such principles.

What is claimed is:

1. A venting valve comprising:
   a securing part and an end member, wherein the securing part and the end member form a monolithic structure;
   wherein the end member comprises an outer circumferential wall and a disk-shaped valve body arranged at an end of the outer circumferential wall facing away from the securing part, wherein the disk-shaped valve body is connected circumferentially to the outer circumferential wall and extends transverse to a center axis of the circumferential wall, wherein the disk-shaped valve body has an outer end face and an inner side that is extending substantially parallel to the outer end face, wherein the disk-shaped valve body is provided with at least one diametrically extending venting slot penetrating the disk-shaped valve body from the outer end face to the inner side;
   wherein the securing part has a mounting diameter in a mounted state such that the securing part is radially elastically expanded and the radial elastic expansion generates a radial force causing a closure tension acting on the venting slot so as to close the venting slot in the mounted state.

2. The venting valve according to claim 1, wherein the securing part is cylindrical.

3. The venting valve according to claim 1, wherein the securing part has an inner side that is provided with a snap-on profile comprising a radially inwardly projecting portion adapted to be engaged from behind by a rim of an apparatus connector to which the venting valve is attached.

4. The venting valve according to claim 1, comprising a conical member, wherein the securing part is connected by the conical member to the end member.

5. The venting valve according to claim 1, wherein the venting slot extends straight.

6. The venting valve according to claim 1, wherein the venting valve is comprised of a unitary elastomer material.

7. A venting valve comprising:
   a securing part and an end member, wherein the securing part and the end member form a monolithic structure;
   wherein the end member comprises an outer circumferential wall and a disk-shaped valve body arranged at an end of the outer circumferential wall facing away from the securing part, wherein the disk-shaped valve body is connected circumferentially to the outer circumferential wall and extends transverse to a center axis of the circumferential wall, wherein the disk-shaped valve body has an outer end face and an inner side that is extending substantially parallel to the outer end face, wherein the disk-shaped valve body is provided with at least one diametrically extending venting slot penetrating the disk-shaped valve body from the outer end face to the inner side;
   wherein the securing part in a mounted state has a mounting length such that the securing part is axially elastically deformed and generates due to the axial elastic deformation a force causing a closure tension acting on the venting slot so as to close the venting slot in the mounted state.

8. The venting valve according to claim 7, wherein the venting slot extends straight.

9. The venting valve according to claim 7, wherein the venting valve is comprised of a unitary elastomer material.

10. The venting valve according to claim 7, comprising a conical member, wherein the securing part is connected by the conical member to the end member.

11. The venting valve according to claim 7, wherein the force is an axial force.

12. The venting valve according to claim 11, wherein the securing part is an insertion part.

13. The venting valve according to claim 12, wherein the securing part has an end section that is thicker than a remaining section of the securing part.

\* \* \* \* \*